(12) United States Patent
Andersson et al.

(10) Patent No.: US 8,755,758 B2
(45) Date of Patent: Jun. 17, 2014

(54) TECHNIQUE FOR SUPPRESSING NOISE IN A TRANSMITTER DEVICE

(75) Inventors: Stefan Andersson, Lund (SE); Kirill Kozmin, Lund (SE); Fredrik Tillman, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 387 days.

(21) Appl. No.: 13/121,228

(22) PCT Filed: Sep. 28, 2009

(86) PCT No.: PCT/EP2009/062534
§ 371 (c)(1),
(2), (4) Date: Jun. 14, 2011

(87) PCT Pub. No.: WO2010/034834
PCT Pub. Date: Apr. 1, 2010

(65) Prior Publication Data
US 2011/0235553 A1    Sep. 29, 2011

Related U.S. Application Data

(60) Provisional application No. 61/104,386, filed on Oct. 10, 2008.

(30) Foreign Application Priority Data

Sep. 29, 2008 (EP) .................................... 08017151

(51) Int. Cl.
*H04B 1/04* (2006.01)
(52) U.S. Cl.
CPC ................................... *H04B 1/0475* (2013.01)
USPC ........................................ 455/126; 455/114.2

(58) Field of Classification Search
USPC ......... 370/276, 277, 310, 317, 318, 480, 497; 455/91, 114.2, 126, 127.1
See application file for complete search history.

(56) References Cited

U.S. PATENT DOCUMENTS 5,444,864 A    8/1995  Smith
7,132,885 B2 *  11/2006  Capofreddi et al. .......... 330/107
(Continued)

FOREIGN PATENT DOCUMENTS

WO     2007018849 A2   2/2007
WO     2008/088603 A1   7/2008

OTHER PUBLICATIONS

Brenna, G. et al., "A 2-GHz Carrier Leakage Calibrated Direct-Conversion WCDMA Transmitter in 0.13-μm CMOS", IEEE Journal of Solid-State Circuits, Aug. 2004, pp. 1253-1262, vol. 39, No. 8.

(Continued)

*Primary Examiner* — Edan Orgad
*Assistant Examiner* — Curtis A Alia
(74) *Attorney, Agent, or Firm* — Coats & Bennett, PLLC

(57) ABSTRACT

A technique of suppressing noise in a transmitter device (300) is provided, wherein the transmitter device (300) comprises a baseband signal processing stage (301) operating at baseband frequency and comprising a modulator (316, 320) for converting a baseband signal into an RF signal, and an RF signal processing stage (301) operating at RF and comprising an amplifier (330). A method implementation of this technique comprises the steps performed in a feedback loop (333, 336) coupled around the amplifier (330) of tapping the RF signal processing stage downstream of the amplifier (330) to obtain an amplified RF signal comprising a baseband signal component and a noise component, downconverting the tapped RF signal to baseband frequency, removing the baseband signal component from the downconverted signal, upconverting the resulting signals still comprising the noise component to RF frequency and feeding the upconverted signal back to the RF signal processing stage upstream of the amplifier (330) thereby suppressing the noise component.

20 Claims, 7 Drawing Sheets

(56) References Cited

U.S. PATENT DOCUMENTS

| | | | |
|---|---|---|---|
| 8,326,239 B1 * | 12/2012 | Peiris et al. | 455/114.3 |
| 2002/0039052 A1 * | 4/2002 | Straub et al. | 331/45 |
| 2005/0084003 A1 * | 4/2005 | Duron et al. | 375/221 |
| 2006/0133536 A1 * | 6/2006 | Rexberg | 375/297 |
| 2007/0004343 A1 | 1/2007 | Kandola et al. | |
| 2007/0165745 A1 | 7/2007 | Fonden et al. | |
| 2007/0184782 A1 | 8/2007 | Sahota et al. | |
| 2009/0097590 A1 * | 4/2009 | McCallister et al. | 375/296 |
| 2010/0022206 A1 * | 1/2010 | Aparin et al. | 455/114.2 |

OTHER PUBLICATIONS

Mirzaei, a. et al., "A Low-Power WCDMA Transmitter with an Integrated Notch Filter", IEEE International Solid-State Circuits Conference, Session 10, 2008, pp. 212, 213, and 608.

* cited by examiner

TECHNIQUE FOR SUPPRESSING NOISE IN A TRANSMITTER DEVICE

TECHNICAL FIELD

The present invention generally relates to the field of suppressing noise in a transmitter device. In particular, the invention relates to a technique of suppressing noise in a transmitter device having a baseband signal processing stage operating at baseband frequency, wherein the baseband signal processing stage comprises a modulator for converting a baseband signal into a Radio Frequency (RF) signal, an RF signal processing stage operating at RF frequency, wherein the RF signal processing stage comprises an amplifier, and a feedback loop coupled around the amplifier.

BACKGROUND

Full duplex transceivers as used in digital wireless communication systems comprise transmitter and receiver devices. In such transceivers, signals are simultaneously transmitted and received via an air interface. In the RF domain of full duplex transceivers, the transmitted and received RF signals are spaced apart from each other by a certain frequency, the so-called "duplex distance".

FIG. 1 shows a schematic block diagram illustrating a conventional full duplex transceiver. The transceiver comprises a transmitter (TX) path and a receiver (RX) path. A duplexer is coupled between the TX path, the RX path and an antenna. The duplexer separates RF signals from the TX path to the antenna and RF signals received via the antenna to the RX path.

The TX path comprises a baseband signal processing stage and an RF signal processing stage. The baseband signal processing stage comprises an in-phase (I) signal branch and a quadrature-phase (Q) signal branch. Each of the I-branch and the Q-branch comprises a digital-to-analog converter (DAC), a filter and a mixer. The mixer is usually implemented as an IQ-modulator and converts low-frequency baseband signals into RF signals. The output signals from the mixer in the I- and Q-branches are provided to the RF signal processing stage.

The RF signal processing stage comprises a signal combining component, a variable gain amplifier (VGA), a surface acoustic wave (SAW) filter and a power amplifier (PA). The signal combining component combines the output signals from the I- and Q-branches into one signal and provides the signal to the VGA. The VGA amplifies the combined signal to a wanted power level and feeds it to the PA. The signal amplified by the PA is then provided to the duplexer which couples the signal to the antenna. The RX path front-end comprises a low noise amplifier (LNA) which is supplied via the duplexer with signals received by the antenna.

In the full duplex transceiver shown in FIG. 1, noise generated within the TX path, i.e. noise generated by the on-chip integrated blocks, leaks through the duplexer into the RX path, as indicated by the semi-circular arrow. In order to reduce the noise leakage from the TX path via the duplexer into the RX path, the SAW filter is placed in the TX path between the VGA and the PA.

However, SAW filters are rather expensive. Furthermore, filters generally require space on a circuit platform, whereas it is a general design aim to reduce the size of transmitter devices, e.g. for usage in mobile applications. Moreover, for multi-band transmitter devices, one filter has to be provided for each band. Thus, the costs and the space required for external filters increases with the number of frequency bands.

An alternative way to decrease the noise leakage from the TX path through the duplexer into the RX path is to increase the power consumption in the TX path. Thereby, the noise generated in the TX path is generally reduced. However, increasing power consumption is not desirable for transmitter devices, in particular battery-powered devices like handheld devices.

The article "A low-power WCDMA transmitter with an integrated notch filter" by Ahmad Mirzaei and Hooman Darabi in "Proceedings of the 2008 IEEE International Solid-State Circuits Conference", pages 212 to 213, discloses a configuration of a Wideband Code Division Multiple Access (WCDMA) transceiver device which is providing noise cancellation without relying on SAW filters. FIG. 2 shows a schematic block diagram illustrating this WCDMA transceiver device configured to reduce transmitter-to-receiver noise leakage.

The transceiver shown in FIG. 2 deviates from the transceiver shown in FIG. 1 in that no SAW filter is included in the TX path between the VGA and the PA. Instead of the SAW filter, a feedback loop is provided around the VGA. Within the feedback loop, noise is removed. In particular, the feedback loop comprises an in-phase branch for I-signals and a quadrature-phase branch for Q-signals. Each of the in-phase branch and the quadrature-phase branch comprises a first mixer MX1 for downconverting the I- and Q-signals based on a receiver local oscillator signal RX LO from RF frequency to baseband frequency, a low-pass filter LPF for filtering the wanted TX signal from the downconverted signal and a second mixer MX2 for upconverting the filtered signal from baseband frequency back to RF frequency.

As can be seen from the first frequency diagram depicted in the feedback loop of FIG. 2, the LPFs produce sharp band-pass filters centred at the RX frequency $f_{RX}$. The LPFs selectively filter noise generated in the RX frequency band. In order to avoid noise leakage into the RX frequency band, the LPFs have a bandwidth which is larger than the RX baseband bandwidth. After the upconversion by the second mixer MX2, the noise power is fed back to the VGA. As can be further seen from the second frequency diagram shown in the upper region of FIG. 2, the VGA is provided with an output impedance which is zero at the RX frequency $f_{RX}$. Thus, noise in the RX frequency band can be attenuated by the frequency-selective feedback loop shown in FIG. 2.

However, transmitter-to-receiver noise leakage is most problematic for short duplex distances. For example, transceiver devices which are operating in accordance with the Third Generation Partnership Project Long Term Evolution (3GPP LTE) standard use signal band-widths of up to 10 MHz together with a short duplex distance. For short duplex distances, the LPFs shown in FIG. 2 have to be sharp high-order low-pass filters. However, high-order low-pass filters, in particular sharp high-order low-pass filters, are generally avoided in feedback systems, since they cause stability problems due to their phase change.

Document U.S. 2007/0165745 A1 concerns a radio transmitter with IQ-modulator error compensation. The transmitter comprises a homodyne observation receiver producing a first real base band signal from a real radio frequency signal, means for converting a complex baseband signal into a second real baseband signal, an adaptor for determining parameters controlling an IQ-error compensator by minimizing the error between the first and second real baseband signals, and means for analogue signal processing of the real radio frequency signal to compensate for the fact that the homodyne observation receiver produces a real and not a complex signal.

Document WO 2008/088603 concerns a wireless communication unit comprising a linearized transmitter having a forward path and a feedback path, respectively comprising at least one up-mixer and down-mixer and forming two loops in quadrature. A phase training signal is applied to the at least one down-mixer in the feedback path in an open loop mode of operation to identify a loop phase adjustment to be applied.

Document U.S. 2007/0184782 A1 concerns an apparatus for cancelling intermodulation interference at baseband of a receiver, comprising a reconstruction circuit configured to receive a first signal, approximate the linear and non-linear characteristics of a leakage path from a transmitter to the receiver, and provide a reconstructed output signal, and a signal adder configured to receive the reconstructed output signal and subtract it from a second signal from the receiver.

SUMMARY

Accordingly, there is a need for a technique of suppressing noise in a transmitter device which is avoiding at least some of the disadvantages outlined above.

This need is satisfied by a method of suppressing noise in a transmitter device and a transmitter device according to the independent claims. Further embodiments are defined in the dependent claims.

According to a first aspect, a method of suppressing noise in a transmitter device having a baseband signal processing stage operating at baseband frequency, wherein the baseband signal processing stage comprises at least one modulator for converting a baseband signal into an RF signal, and an RF signal processing stage operating at RF, wherein the RF signal processing stage comprises at least one amplifier is provided. The method comprises the steps performed in a feedback loop coupled around the at least one amplifier of tapping the RF signal processing stage downstream of the at least one amplifier to obtain an amplified RF signal comprising a baseband signal component and a noise component, down-converting the tapped RF signal to baseband frequency, removing the baseband signal component from the downconverted signal, upconverting the resulting signal still comprising the noise component to RF frequency and feeding the upconverted signal back to the RF signal processing stage upstream of the at least one amplifier thereby suppressing the noise component.

The technique for suppressing noise in a transmitter device is based on the finding that the noise component is mainly generated by the amplifier in the RF signal processing stage and the modulator in the baseband signal processing stage. By providing the feedback loop (at least) around the amplifier of the RF signal processing stage, the noise component is amplified by a closed loop gain of the amplifier, while the RF signal is amplified by an open loop gain of the amplifier. Thus, different transfer functions are provided for the RF signal and the noise component (at least for the noise component existing at the duplex distance).

In order to obtain the baseband signal component that is to be removed from the downconverted signal, the baseband signal processing stage may be tapped. In particular, the baseband signal component (which is not comprising the noise component) may be tapped in the baseband processing stage before the upconversion by the modulator of the baseband signal to RF frequency and the amplification by the amplifier of the RF signal processing stage. The baseband signal component may subsequently be subtracted from the downconverted RF signal, which is comprising the baseband signal component and the noise component, thereby providing a signal essentially containing the noise component.

According to one aspect, the tapped baseband signal component may be amplified. This amplification may be provided in a separate signal path between the baseband signal processing stage and the feedback loop before the removing of the baseband signal component from the downconverted signal.

In case the baseband signal component cannot be completely removed from the downconverted signal, the signal gain provided by the amplifier in the RF signal processing stage may decrease. In order to enable an essentially complete removal of the baseband signal component from the downconverted signal, a gain calibration of the amplifying of the tapped baseband signal component may be provided. The gain calibration may be performed such that the gain provided by the amplifying of the tapped baseband signal component matches a gain provided in a signal path between the tapping of the baseband processing stage and the removing of the baseband signal component from the downconverted signal via the amplifier of the RF signal processing stage.

In order to reduce power consumption of the transmitter device, the amplifying of the tapped baseband signal component and the feeding of the unconverted signal back to the RF signal processing stage may be selectively enabled when the amplifier of the RF signal processing stage is providing a high-gain amplification. Such a selective enabling can be provided without essentially deteriorating the noise reduction performance of the transmitter device, since noise is mainly a problem when the amplifier of the RF signal processing stage is providing a high-gain amplification, i.e. when output signals having a high output power are generated.

Furthermore, by selectively enabling the amplifying of the tapped baseband signal component when the amplifier of the RF signal processing stage is providing a high-gain amplification, the gain range provided by the amplifying of the tapped baseband signal component can be reduced so that it only corresponds to a fraction of the entire gain range of the transmitter device. Thereby, the implementation of the amplifying of the tapped baseband signal and the calibration of the amplifying can be simplified.

In order to feed the signal essentially containing the baseband signal component back to the amplifier of the RF signal processing stage, the step of feeding the upconverted signal back to the RF signal processing stage may comprise subtracting the upconverted signal from an upconverted output signal of the baseband signal processing stage. The upconversion of the output signal of the baseband signal processing stage may be provided by the modulator. The modulator may be an IQ-modulator or any other modulator.

In order to remove signal artefacts created by the downconversion within the feedback loop, the downconverted signal may be filtered. The filtering in the feedback loop may comprise low-pass filtering of undesired signal content, such as image signals generated during the downconversion. This filtering provided after the downconversion may filter out any noise component generated outside the RX band by the amplifier in the RF signal processing stage or the modulator in the baseband signal processing stage.

According to a further aspect, the baseband signal component may be derived from both an in-phase signal and a quadrature-phase signal. The baseband signal processing stage may thus comprise an in-phase signal branch and a quadrature-phase signal branch. In order to enable processing different signal components simultaneously, the steps of suppressing noise in a transmitter device may be performed for each one of the in-phase signal branch and the quadrature-phase signal branch simultaneously in separate feedback loops.

The amplifier of the RF signal processing stage may provide a variable gain amplification. In particular, the variable gain amplification may drive a power amplifier of the signal processing stage.

The noise component may comprise at least one of noise content and distortion content generated by at least one of the modulator and the amplifier. By suppressing the noise content, transmitter-to-receiver leakage can be reduced. Furthermore, by suppressing the distortion content, the linearity of the transmitter device can be improved.

According to a further aspect, a method of suppressing noise in a transmitter device having a baseband signal processing stage operating at baseband frequency and comprising at least one modulator for converting a baseband signal into an RF signal, and an RF signal processing stage operating at RF and comprising at least one amplifier for amplifying the RF signal is provided. The method comprises the following steps performed in a feedback loop coupled around the at least one amplifier of tapping the RF signal processing stage downstream of the at least one amplifier to obtain an amplified RF signal comprising a baseband signal component and a noise component, downconverting the tapped RF signal to baseband frequency, removing the baseband signal component from the downconverted signal in order to obtain a signal essentially containing the noise component and feeding the signal essentially containing the noise component back to the baseband signal processing stage upstream of the at least one modulator thereby suppressing the noise component.

As for a hardware aspect, a transmitter device is provided. The transmitter device comprises a baseband signal processing stage operating at baseband frequency, wherein the baseband signal processing stage comprises at least one modulator for converting a base-band signal into an RF signal, an RF signal processing stage operating at RF, wherein the RF signal processing stage comprises at least a first amplifier, and a feedback loop coupled around the first amplifier. The feedback loop comprises a first tapping unit for tapping an amplified RF signal comprising a baseband signal component and a noise component down-stream of the first amplifier, a downconverting unit for downconverting the tapped RF signal to baseband frequency, a removing unit for removing the baseband signal component from the downconverted signal and an upconverting unit for upconverting the resulting signal still comprising the noise component to RF frequency, wherein the feedback loop is configured to feed the upconverted signal back to the RF signal processing stage upstream of the first amplifier thereby suppressing the noise component. The downconverting unit and the upconverting unit may be mixer.

The feedback loop may further comprise a second tapping unit for tapping the base-band signal component that is to be removed from the downconverted signal. In one implementation, the feedback loop further comprises a dedicated amplifier for amplifying the tapped baseband signal. The feedback loop may also comprise a filter for filtering the down-converted signal to remove signal artefacts created by the down-conversion. The filter may be a low-pass filter.

As for a further hardware aspect, a transmitter device is provided. The transmitter device comprises a baseband signal processing stage operating at baseband frequency, wherein the baseband signal processing stage comprises at least one modulator for converting a baseband signal into an RF signal, an RF signal processing stage operating at RF, wherein the RF signal processing stage comprises at least a first amplifier, and a feedback loop coupled around the first amplifier. The feedback loop comprises a first tapping unit for tapping an amplified RF signal comprising a baseband signal component and a noise component downstream of the first amplifier, a downconverting unit for downconverting the tapped RF signal to baseband frequency and a removing unit for removing the baseband signal component from the downconverted signal in order to obtain a signal essentially containing the noise component, wherein the feedback loop is configured to feed the signal essentially containing the noise component back to the baseband signal processing stage upstream of the at least one modulator thereby suppressing the noise component.

As for a still further hardware aspect, a transceiver device is provided. The transceiver device comprises a transmitter device, a receiver device and a duplexer having an antenna port, wherein the duplexer is configured to frequency selectively couple RF signals from the transmitter device to the antenna port and RF signals received via the antenna port to the receiver device.

BRIEF DESCRIPTION OF THE DRAWINGS

In the following, the invention will be described with reference to exemplary embodiments illustrated in the drawings, wherein.

DETAILED DESCRIPTION

In the following, for purposes of explanation and not limitation, specific details are set forth, such as particular sequences of steps, components and configurations, in order to provide a thorough understanding of the present invention. It will be apparent to one skilled in the art that the present invention may be practiced in other embodiments that depart from these specific details. For example, while the embodiments will be described with reference to a transmitter device and a transceiver device, it will be apparent to the skilled person that the invention can also be practiced in context with any telecommunication devices, for example a mobile station incorporating a transceiver device. Moreover, while the embodiments will be described with reference to the 3GPP LTE standard, it will be apparent to the skilled person that the invention can also be practiced in context with other telecommunication standards.

Figure 3:
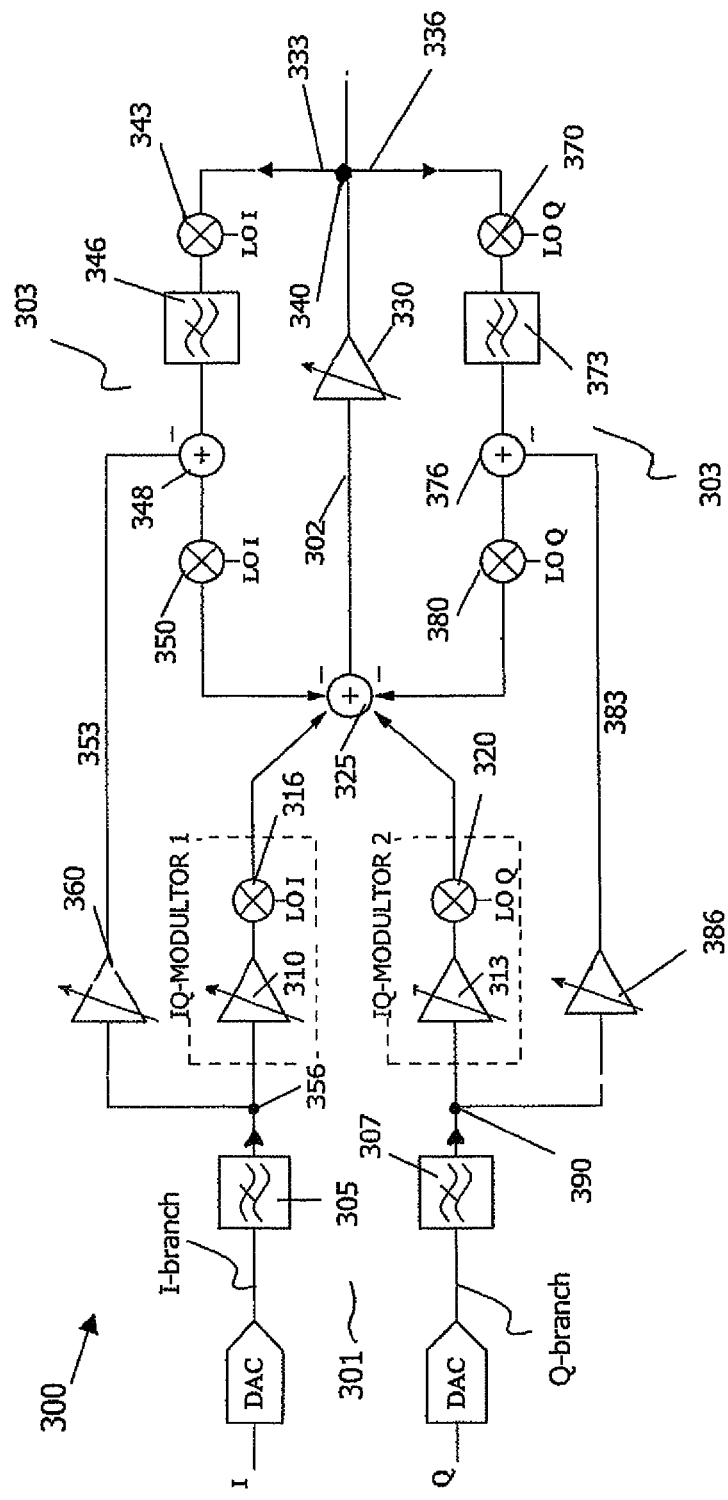
FIG. 3 is a schematic block diagram illustrating a first embodiment of a transmitter device.

FIG. 3 shows a schematic block diagram illustrating a first embodiment of a transmitter device 300. The transmitter device 300 converts I- and Q-baseband signals into RF signals for transmission via an air interface (not shown), while preserving baseband signal information. The transmitter device 300 comprises a baseband signal processing stage 301, an RF signal processing stage 302 and a feedback stage 303.

The baseband signal processing stage 301 comprises an I-branch for processing I signals and a Q-branch for processing Q-signals. Accordingly, I- and Q-signals are provided to the respective branches. Each of the I- and Q-branches comprises a digital-to-analog converter, i.e. DAC1, DAC2, for converting the digital I- and Q-signals into analog signals, a filter 305, 307 and a modulator, i.e. IQ-modulator 1 and IQ-modulator 2. Each of the IQ-modulators 1, 2 comprises an amplifier 310, 313 and a mixer 316, 320. Mixer 316 mixes the filtered I-signal with an in-phase local oscillator signal LO I and Mixer 320 mixes the filtered Q-signal with a quadrature-phase local oscillator signal LO Q. Thereby, IQ-Modulator 1 provides an upconversion of the filtered I-signal from baseband frequency to RF frequency and IQ-Modulator 2 provides an upconversion of the filtered Q-signal from baseband frequency to RF frequency. Subsequent to the upconversion of the I- and Q-signals to RF frequency, the signals are provided to the RF signal processing stage. The RF signal processing stage 302 comprises a first circuit node 325 and a VGA 330.

At the first circuit node 325, the upconverted I- and Q-signals are combined into one RF signal. The VGA 330 amplifies the RF signal provided by the first circuit node 325.

Figure 4:
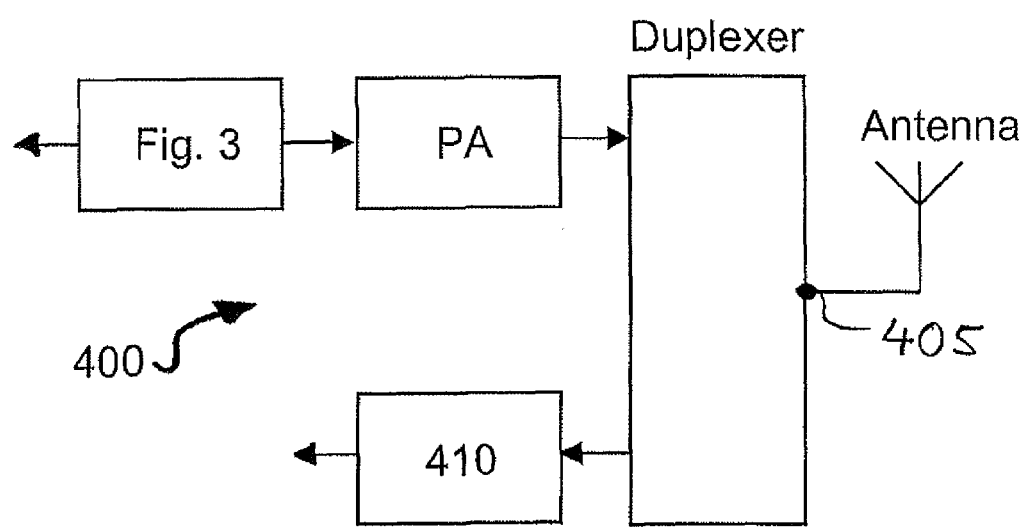
FIG. 4 is a schematic block diagram illustrating an embodiment of a transceiver device.

FIG. 4 shows a schematic block diagram illustrating an embodiment of a transceiver device 400 in which the transmitter device 300 of FIG. 3 is implemented. The transceiver device 400 is a full duplex transceiver device which may for example be included in a hand-held device (e.g., a mobile telephone) operating in accordance with the 3GPP standards or other standards using frequency division duplex (FDD) techniques.

Further to the transmitter device 300 of FIG. 3, the transceiver device 400 comprises a PA, a duplexer having an antenna port 405, a receiver device 410 and antenna coupled to the port 405. Transmitter device 300 supplies the RF signals amplified by VGA 330 to the PA. The amplification provided by VGA 330 drives the PA. The RF signals from transmitter device 300 are amplified by the PA and are coupled by the duplexer via the port 405 to the antenna. Furthermore, the duplexer couples RF signals received by the antenna via the port 405 to the receiver device 410.

Noise content generated within the transmitter device 300 of FIG. 3, i.e. IQ-Modulator 1, IQ-Modulator 2 and VGA 330, may leak through the duplexer into the receiver device 410.

In order to suppress at least one of the noise and distortion content, a feedback stage 303 is provided in the transmitter device 300 of FIGS. 3 and 4. As shown in FIG. 3, the feedback stage 303 comprises a first feedback loop 333 for processing I-signals and a second feedback loop 336 for processing Q-signals. Both feedback loops 333 and 336 have an identical structure. In the following, only the first feedback loop 333 will thus be explained in detail.

The first feedback loop 333 is provided from the second circuit node 340 around the VGA 330 to the first circuit node 325. At the second circuit node 340, the feedback loop 333 is supplied with the tapped RF signal amplified by the VGA 330. The first feedback loop 333 comprises a downconverting unit 343, a low-pass filter 346, a removing unit 348 and an upconverting unit 350. The downconverting unit 343 and the upconverting unit 350 are realised as mixers. Furthermore, a signal path 353 for providing a baseband signal component to the first feedback loop 333 is provided. The signal path 353 is tapping the baseband signal component at a third circuit node 356 provided within the baseband signal processing stage between filter 305 and IQ-Modulator 1 and provides the baseband signal component to the removing unit 348. Moreover, an amplifier 360 for amplifying the baseband signal component is provided within the signal path 353.

Figure 5:
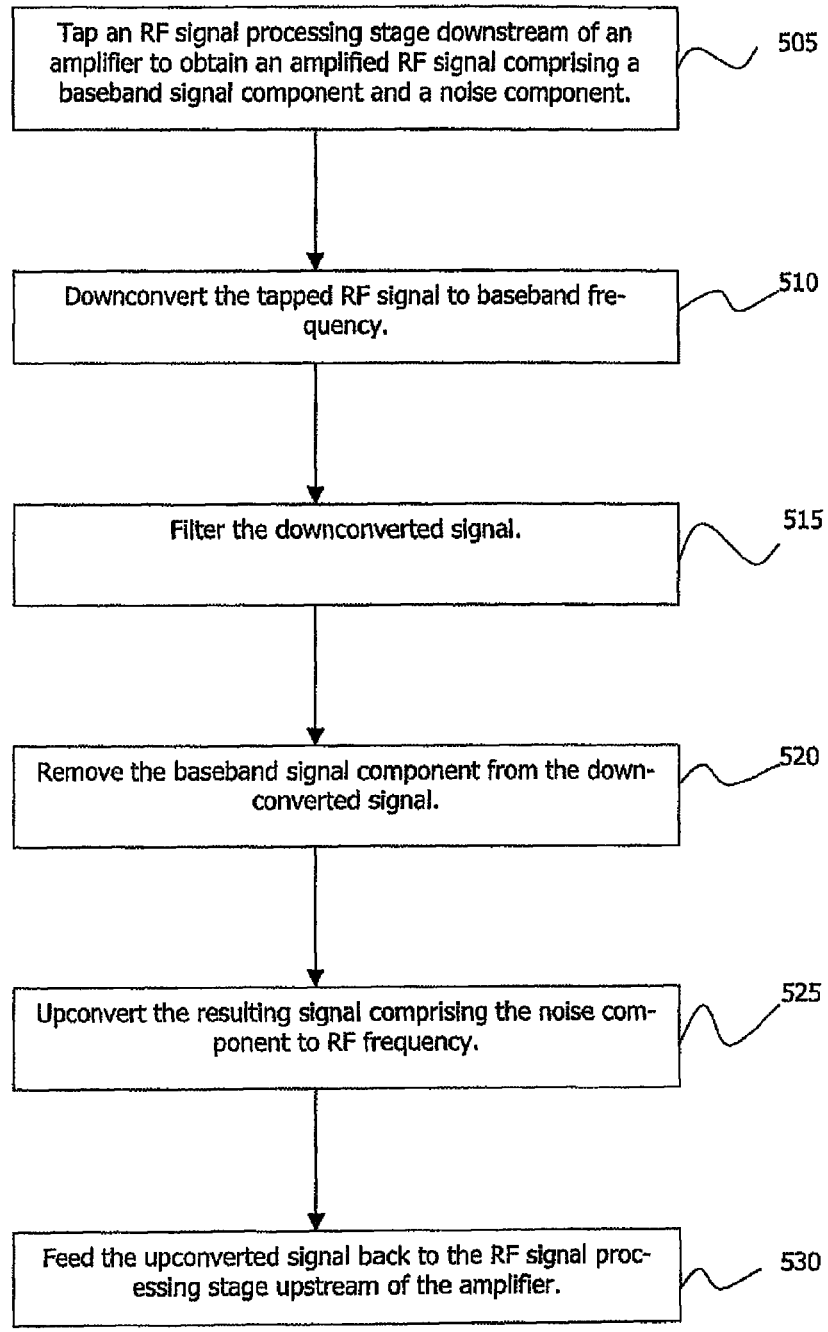
FIG. 5 is a flow chart illustrating an embodiment of a method of suppressing noise in the transmitter device of FIG. 3 or the transceiver device of FIG. 4.

FIG. 5 is a flow chart illustrating an embodiment of a method 500 of suppressing noise in the transmitter device 300 of FIGS. 3 and 4. The method 500 will be explained with reference to FIGS. 3 and 5.

The method 500 starts in step 505 by tapping the RF signal processing stage 302 at the second circuit node 340 downstream of the VGA 330 to obtain an amplified RF signal comprising a baseband signal component and a noise component.

Thereafter, in step 510, the tapped RF signal is downconverted to baseband frequency. In particular, the RF signal tapped at the second circuit node 340 is mixed at the downconverting unit 343 with an in-phase local oscillator signal LO I and downconverted to baseband frequency.

After the downconversion, the downconverted signal is low-pass filtered in step 515 by low-pass filter 346 in order to remove image signals and unwanted quadrature signals generated during the downconversion. As can be seen from equation (2), the image signal centred at two times the transmission frequency is undesired signal content and is removed by low-pass filter 346. However, essentially no noise content or distortion content generated by IQ-Modulator 1 or VGA 330 need to be removed or suppressed by low-pass filter 346. The image as well as the quadrature signals are located at twice the LO signal frequency. Therefore, no sharp high-order LP filter is required. The low-pass filter 346 can thus be configured as a low-cost component.

Stability is one of the major problems when using feedback loops at RF frequency. Delay and phase change from filters and mixers located in the feedback loop may cause instability of the transmitter device. Therefore, no sharp high-order filter is used for low-pass filter 346, since thereby, a too large phase-change in the first feedback loop 333 could occur.

The low-pass filtered signal, which is a signal containing a baseband signal component from the baseband signal processing stage 301 and a noise component from IQ-Modulator 1, IQ-Modulator 2 and/or VGA 330, is provided to the removing unit 348.

At step 520, the removing unit 348 removes the baseband signal component, which has been tapped at the third circuit node 356 of the baseband signal processing stage 301 and amplified by the amplifier 360, from the low-pass filtered signal. Since the baseband signal component is tapped at the third circuit node 356 before the upconversion by IQ-Modulator 1 and the amplification by VGA 330, the baseband signal component comprises essentially no signal energy at the duplex frequency. Therefore, after the removing of the baseband signal component in the removing unit 348, the signal essentially comprises the noise component only.

The signal comprising the noise component is subsequently provided to the upconverting unit 350, which is in step 525 upconverting the signal (using the in-phase local oscillator signal LO I) from baseband frequency back to RF frequency. By the upconversion, an RF signal essentially comprising the noise component is obtained.

Thereafter, in step 530, the upconverted signal is fed back to the RF signal processing stage 302 upstream of the VGA 330. The upconverted signal is subtracted at the first circuit node 325 from the output signal of the baseband signal processing stage 301. Thus, a signal essentially comprising the baseband signal component is provided and supplied to the VGA 330 for open loop amplification.

Due to the first feedback loop 333, the noise component is affected by a closed loop gain of the VGA 330, whereas the baseband signal component is amplified with an open loop gain of the VGA 330. In other words, the noise component is only amplified by the closed loop gain, which is essentially lower than the open loop gain. Therefore, the Adjacent Channel Leakage Ratio (ACLR) and the Signal-to-Noise Ratio (SNR) of the transmitter device can be improved.

Figure 1:
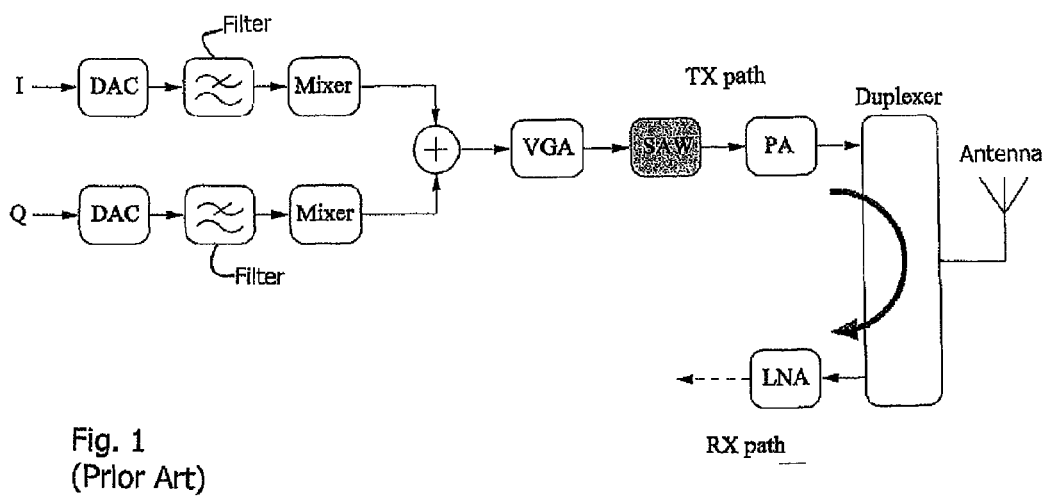
FIG. 1 is a schematic block diagram illustrating a first transceiver device known from the prior art.
Figure 2:
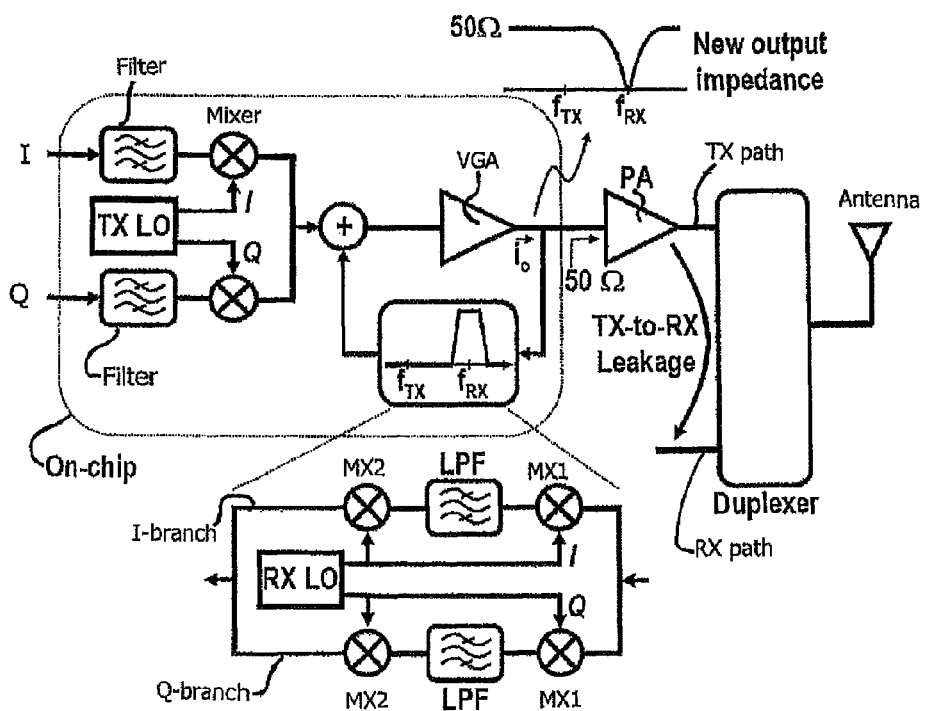
FIG. 2 is a schematic block diagram illustrating a second transceiver device known from the prior art.

Moreover, when the transmitter device 300 is included in the transceiver device 400 of FIG. 4, noise content at the duplex distance can be reduced (or will at least not be amplified as much as the baseband signal component amplified by the VGA 330). Thus, not only noise content at the RX frequency of the receiver device 410 is reduced, which would be the case for pure filtering as in FIG. 2. In order to further prevent transmitter-to-receiver noise leakage in the transceiver device 400, the low pass filter 346 may have a bandwidth that is larger than the duplex distance of the transceiver device 400.

Since the baseband signal component is removed at the removing unit 348, the gain provided by the amplifier 360 should match the gain provided between the third circuit node 356 and the removing unit 348 on the signal path via IQ-Modulator 1, first circuit node 325, VGA 330, second circuit node 340, downconverting unit 343 and low-pass filter 346. To this end, the amplifier 360 is calibrated.

A calibration can be provided by disconnecting the output of the upconverting unit 350 and thereafter minimizing the signal content at the output of the removing unit 348, i.e. at the input of the upconverting unit 350. By calibrating the gain of the amplifier 360, the baseband signal component may be completely removed within the first feedback loop 333. Thus, the effective signal gain at VGA 330 does not decrease. In particular, the calibration accuracy depends on how much gain-loss can be tolerated in the first feedback loop 333.

In the transmitter device 300, the first feedback loop 333 and the amplification by the amplifier 360 may be selectively enabled. In particular, a switching unit (not shown) may be provided which selectively enables the first feedback loop 333 and the amplification by the amplifier 360. The switching unit may only enable the first feedback loop 333 and/or the amplifier 360 when the VGA 330 provides a high-gain amplification. Thereby, the power consumption of the transmitter device 300 may be reduced. Such a selective enabling by the switching unit is flexible, since noise is only a major problem for high output power.

Similar to the first feedback loop 333 for I-signals, the second feedback loop 336 for Q-signals comprises a downconverting unit 370, a low-pass filter 373, a removing unit 376, an upconverting unit 380 and further signal path 383 including an amplifier 386 between a circuit node 390 at the Q-branch and the removing unit 376. A gain calibration may also be provided for the amplifier 386. Furthermore, the second feedback loop 336 and the amplifier 386 may also be selectively enabled. As stated above, the second feedback loop 336 is essentially identical to the first feedback loop 333, and therefore a more detailed description of it omitted here.

The transmitter device 300 provides especially good noise suppression results, while still being staple, for short duplex distances. The first feedback loop 333, the second feedback loop 336 and the amplification by the amplifiers 360, 386 may also be selectively disabled for large duplex distances, when not needed.

Since no external filters are necessary, costs and space of the transmitter device 300 can be reduced. However, the technique of suppressing noise in a transmitter device can also be used to improve the linearity of the transmitter device 300. Baseband distortion created in IQ-Modulator 1 and/or IQ-Modulator 2 can be suppressed in the same way as the noise component. Thus, besides improving the noise performance, the linearity of the transmitter device 300 and thereby its ACLR can also be improved.

Figure 6:
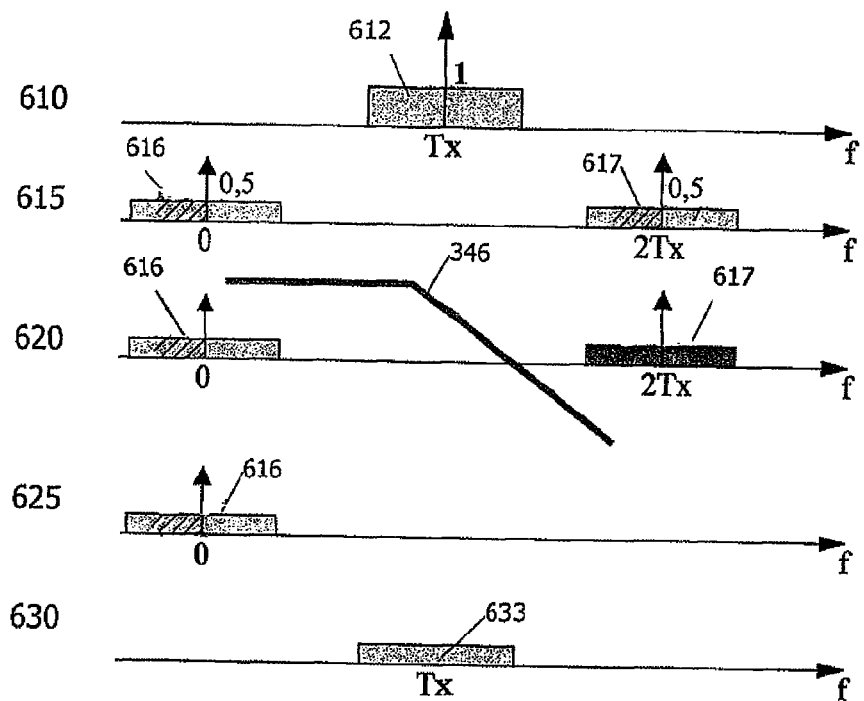
FIG. 6 is a sequence of five frequency diagrams illustrating a processing of an RF signal through a feedback loop of the transmitter device of FIG. 3 or the transceiver device of FIG. 4.

FIG. 6 shows is a sequence of five frequency diagrams schematically illustrating how an RF signal passes through the first feedback loop 333 of FIG. 3. In particular, FIG. 6 shows five frequency diagrams in which normalized signals are illustrated over the frequency f. In order to simplify the explanation, it is assumed that the downconverting unit 343, the low-pass filter 346 and the upconverting unit 350 of FIG. 3 are ideal elements not generating any noise or distortion.

In the first frequency diagram 610, the RF signal 612 tapped at the second circuit node 340 of FIG. 3 is illustrated. The RF signal 612 is centred at the transmission frequency TX. The normalized RF signal 612 comprises a signal component and a noise component.

The second frequency diagram 615 shows how the RF signal is downconverted in the downconverting unit 343 of FIG. 3. The downconverting unit 343 simultaneously provides an up- and downconversion of the RF signal, since $$\sin(\omega_{RF}t)*\sin(\omega_{Lo}t)=0.5\cos((\omega_{Lo}-\omega_{RF})t)-0.5\cos((\omega_{Lo}+\omega_{RF})t) \quad (1)$$

applies.

Thus, a downconverted signal 616 centred at the zero frequency and an image signal 617 centred at two times the transmission frequency, i.e. 2*TX, is generated. In this embodiment, sine and cosine waveforms are used to drive the downconverting unit 343. Therefore, the output signal of the downconverting unit 343 is:

$$[I^*\sin(\omega_{Lo}t)+Q^*\cos(\omega_{Lo}t)]*\sin(\omega_{Lo}t)=0.5*I-0.5*I*\cos(2\omega_{Lo}t)+0.5*Q*\sin(2\omega_{Lo}t) \quad (2)$$

The image signal 617 centred at twice the TX LO frequency is undesired signal content and is removed by the low-pass filter 346 of FIG. 3, as can be seen from the third frequency diagram 620 of FIG. 6. In particular, the low-pass filter 346 removes the signal content at $2*\omega_{Lo}$. Since the undesired signal content to be removed by the low-pass filter 346 is located at twice the TX LO frequency, the demands on the low-pass filter 346 are low. In particular, no sharp high-order low pass filter, which could cause instability of the transmitter device 300, is required.

In the fourth frequency diagram 625, only the downconverted signal 616 is present. In particular, the fourth frequency diagram 625 shows the state before the subtraction of the baseband signal at the removing unit 348. Thus, the baseband signal component is subtracted from the downconverted signal 616 so that a signal essentially comprising the noise component is provided.

The signal essentially comprising the noise component is thereafter upconverted by the upconverting unit 350 of FIG. 3 to RF frequency so that an RF signal 633 centred at the TX frequency is generated, as can be seen in the fifth frequency diagram 630 of FIG. 6.

Figure 7:
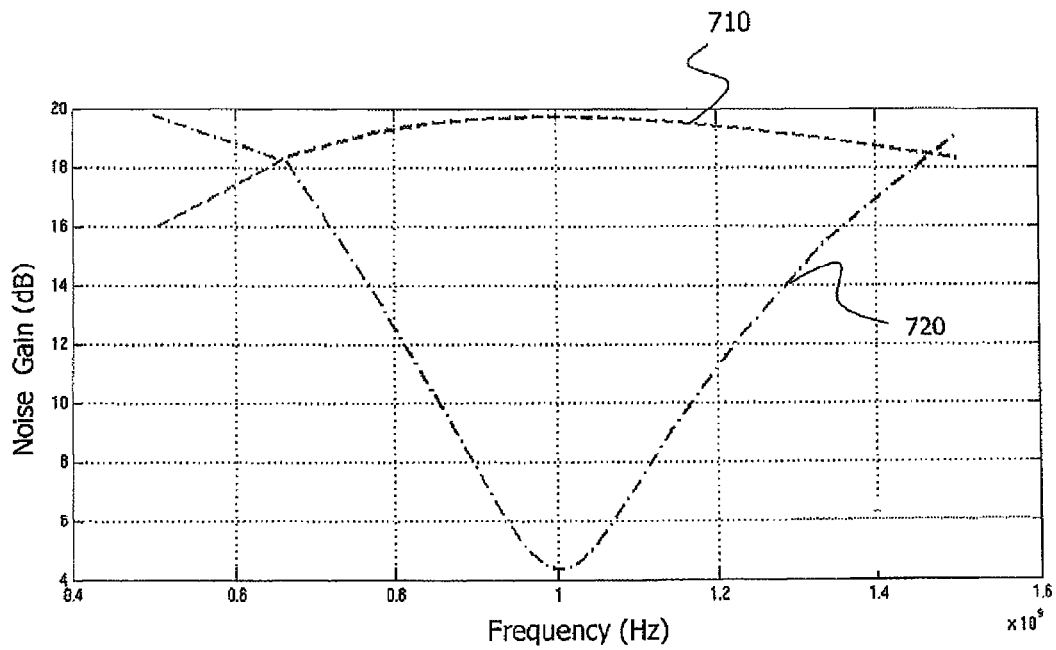
FIG. 7 is a frequency diagram showing noise transfer functions when the feedback loop of the transmitter device of FIG. 3 or the transceiver device of FIG. 4 is enabled and disabled.

FIG. 7 is a frequency diagram showing a first noise transfer function 710 when the first feedback loop 333 of FIG. 3 is disabled and a second noise transfer function 720 when the first feedback loop 333 of FIG. 3 is enabled. In particular, FIG. 7 shows the gain of VGA 330 in dB over the frequency in Hz (i.e. the noise gain or noise transfer function) and illustrates the impact of the first feedback loop 333 on the noise level generated by the transmitter device 300. The used transmission carrier frequency is 1 GHz. As can be seen when comparing the first 710 and the second 720 noise transfer function, with a 20 dB gain of VGA 330, a noise suppression of about 15 dB can be achieved with the technique illustrated herein.

Figure 8:
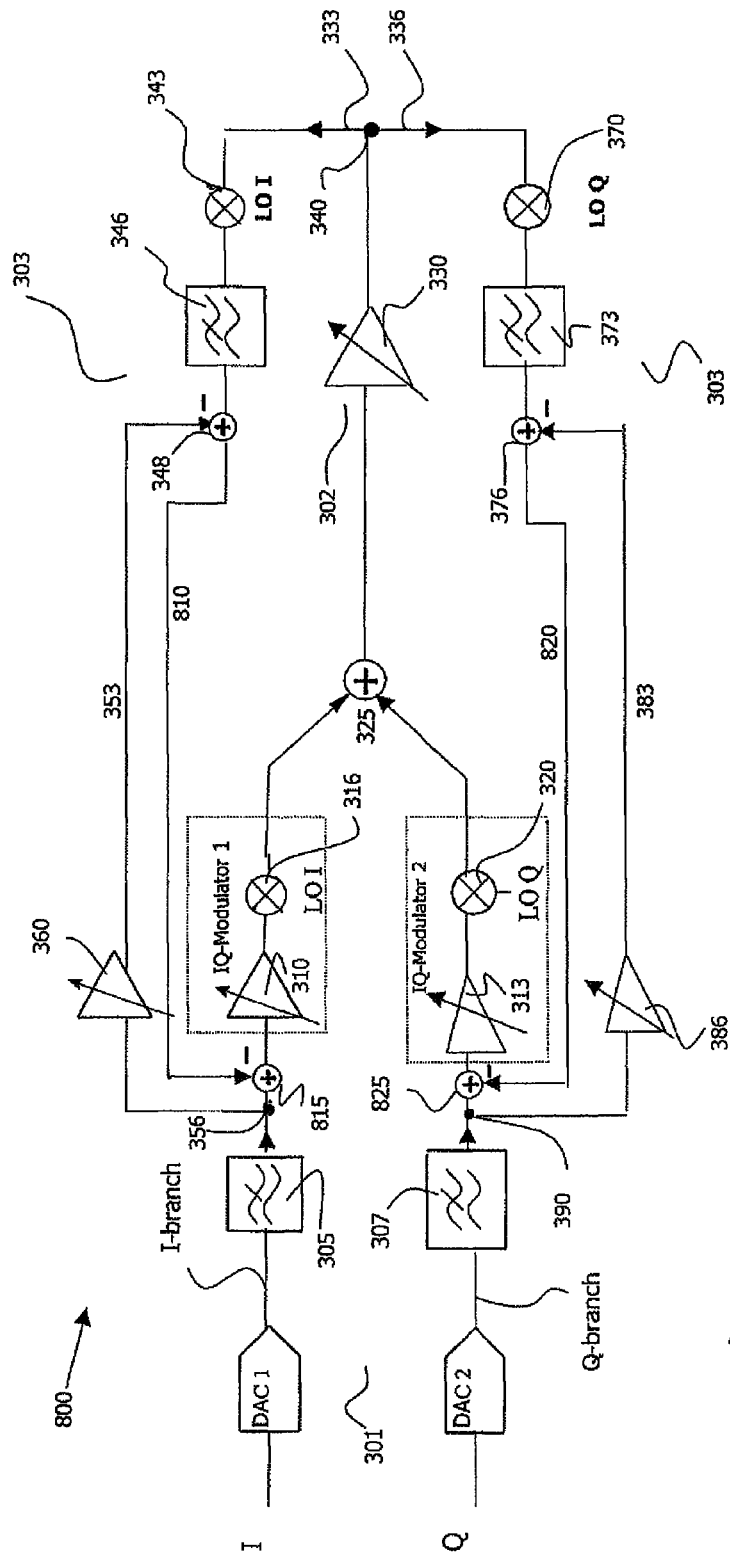
FIG. 8 is a schematic block diagram illustrating a second embodiment of a transmitter device.

FIG. 8 shows a schematic block diagram illustrating a second embodiment of a transmitter device. The transmitter device 800 shown in FIG. 8 differs from the transmitter device 300 shown in FIG. 3 in that the upconverting units 350, 380 are removed and the output signals of the removing units 348, 376 are not fed back to the RF signal processing stage 302, i.e. the first circuit node 325, but to the baseband signal processing stage 301.

For the feedback to the I-branch of the baseband signal processing stage 301, a circuit path 810 is provided which feeds the output signal of the removing unit 348 (i.e. the signal essentially containing a noise component) to a subtracting unit 815. The subtracting unit 815 is provided between the third circuit node 356 and the IQ-Modulator 1, i.e. upstream of the amplifier 310 and the mixer 316. The subtracting unit 815 subtracts the signal essentially containing the noise component from the I-branch signal provided at the third circuit node 356.

Similar, for the feedback to the Q-branch of the baseband signal processing stage 301, a circuit path 820 is provided which feeds the output signal of the removing unit 376 to a subtracting unit 825. The subtracting unit 825 is provided between the circuit unit 390 and the IQ-Modulator 2, i.e. upstream of the amplifier 313 and the mixer 320.

The other elements of the transmitter device 800 shown in FIG. 8 are identical to the elements shown in FIG. 3 and have the same reference signs. Accordingly, these elements are not explained in detail again.

Figure 9:
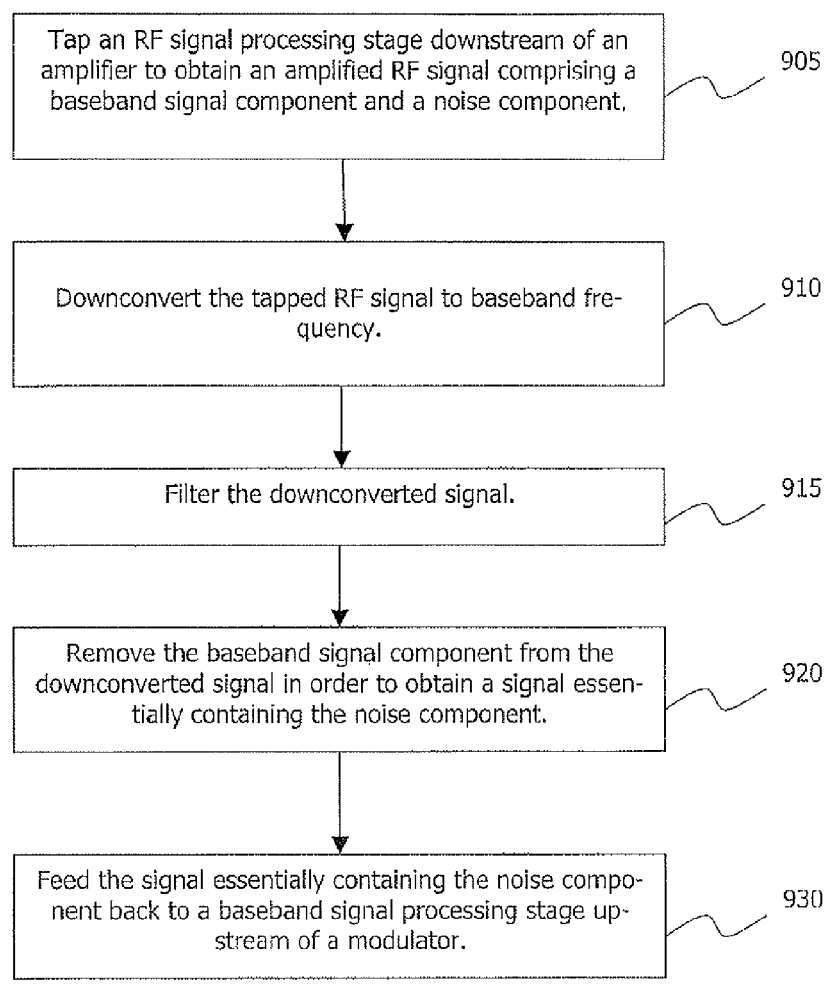
FIG. 9 is a flow chart illustrating an embodiment of a method of suppressing noise in the transmitter device of FIG. 8 or the transceiver device of FIG. 4.

FIG. 9 is a flow chart illustrating an embodiment of a method 900 of suppressing noise in the transmitter device 800 of FIG. 8. The method 900 will be explained with reference to FIGS. 8 and 9, i.e. the I-branch of FIG. 8.

The method starts in step 905 by tapping the RF signal processing stage 302 at the second node 340 downstream of the VGA 330 to obtain an amplified RF signal comprising a baseband signal component and a noise component. Thereafter, in step 910, the tapped RF signal is downconverted to baseband frequency. In particular, the RF signal tapped at the second circuit node 340 is mixed at the downconverting unit 343 with an in-phase local oscillator signal LO I and downconverted to baseband frequency.

After the downconversion, the downconverted signal is in step 915 low-pass filtered by low-pass filter 346 in order to remove image signals and unwanted quadrature signals generated during the downconversion.

Thereafter, the low-pass filtered signal is provided to the removing unit 348. At step 920, the removing unit 348 removes the baseband signal component, which has been tapped at the third circuit node 356 of the baseband signal processing stage 301 and amplified by the amplifier 360, from the low-pass filtered signal. Thus, a signal which is essentially containing a noise component is provided.

In subsequent step 930, the signal essentially containing the noise component is fed back to the baseband signal processing stage 301 upstream of IQ-Modulator 1 and IQ-Modulator 2, thereby suppressing the noise component.

As can be seen from FIG. 8, the signal essentially containing the noise component is fed back to the subtracting unit 815. Since the signal essentially containing the noise component is fed back to the baseband signal processing stage 301 operating at baseband frequency, the upconverting unit 350 shown in FIG. 3 for upconversion to RF frequency is not necessary.

In order to improve the stability of transmitter device 800, the loop gain of the feed-back loops may be limited.

The same method as described with regard to FIG. 9 can also be used for the Q-branch of transmitter device 800. Furthermore, the transmitter device 800 can be employed in the transceiver device 400 shown in FIG. 4, i.e. instead of the transmitter device 300 of FIG. 3. Accordingly, the method shown in FIG. 9 can also be used in the transceiver device 400 of FIG. 4.

Although embodiments of the proposed technique have been illustrated in the accompanying drawings and described in the description, it will be understood that the invention is not limited to the embodiments disclosed herein. In particular, the proposed technique is capable of numerous rearrangements, modifications and substitutions without departing from the scope of the invention as set forth and defined by the following claims.

The invention claimed is:

1. A method of suppressing noise in a transmitter device having a baseband signal processing stage and a radio frequency (RF) processing stage, the baseband signal processing stage operating at a baseband frequency and comprising at least one modulator for converting a baseband signal into an RF signal, and the RF signal processing stage operating at RF and comprising at least one amplifier for amplifying said RF signal, wherein the method is implemented in a feedback loop coupled around the at least one amplifier and comprises the following steps:
   tapping the RF signal processing stage downstream of the at least one amplifier to obtain an amplified RF signal comprising a baseband signal component and a noise component;
   downconverting the tapped RF signal to baseband frequency;
   removing the baseband signal component from the downconverted signal;
   upconverting the resulting signal still comprising the noise component to RF; and
   feeding the upconverted signal back to the RF signal processing stage upstream of the at least one amplifier, thereby suppressing the noise component.

2. The method of claim 1, further comprising tapping the baseband signal processing stage to obtain the baseband signal component that is to be removed from the downconverted signal.

3. The method of claim 2, further comprising amplifying the tapped baseband signal component.

4. The method of claim 3, further comprising calibrating a gain of the amplifying of the tapped baseband signal component to match a gain provided in a signal path between the tapping of the baseband processing stage and the removing of the baseband signal component from the downconverted signal via the at least one amplifier of the RF signal processing stage.

5. The method of claim 3, further comprising selectively enabling the amplifying of the tapped baseband signal component and the feeding of the upconverted signal back to the RF signal processing stage when the at least one amplifier of the RF signal processing stage is providing a high-gain amplification.

6. The method of claim 1, wherein the feeding of the upconverted signal back to the RF signal processing stage comprises subtracting the upconverted signal from an upconverted output signal of the baseband signal processing stage.

7. The method of claim 1, further comprising filtering the downconverted signal to remove signal artefacts created by the downconversion.

8. The method of claim 7, wherein the filtering comprises low-pass filtering of image signals generated during the downconversion.

9. The method of claim 1, wherein the baseband signal processing stage comprises an in-phase signal branch and a quadrature-phase signal branch, and wherein the method comprises performing said steps simultaneously in separate feedback loops for each one of the in-phase signal branch and the quadrature-phase signal branch.

10. The method of claim 1, wherein the at least one amplifier of the RF signal processing stage provides a variable gain amplification.

11. The method of claim 1, wherein the noise component comprises at least one of noise content and distortion content generated by at least one of the modulator and the amplifier.

12. The method of claim 1, wherein the baseband signal component is derived from both an in-phase signal and a quadrature-phase signal.

13. A method of suppressing noise in a transmitter device having a baseband signal processing stage and a radio frequency (RF) processing stage, the baseband signal processing stage operating at a baseband frequency and comprising at least one modulator for converting a baseband signal into an RF signal, and the RF signal processing stage operating at an RF and comprising at least one amplifier for amplifying said RF signal, wherein the method is implemented in a feedback loop coupled around the at least one amplifier and comprises the following steps:
  tapping the RF signal processing stage downstream of the at least one amplifier to obtain an amplified RF signal comprising a baseband signal component and a noise component;
  downconverting the tapped RF signal to baseband frequency;
  removing the baseband signal component from the downconverted signal in order to obtain a signal essentially containing the noise component; and
  feeding the signal essentially containing the noise component back to the baseband signal processing stage upstream of the at least one modulator, thereby suppressing the noise component.

14. A transmitter device comprising:
  a baseband signal processing stage operating at baseband frequency and comprising at least one modulator for converting a baseband signal into an RF signal, and
  a radio frequency (RF) signal processing stage operating at RF and comprising at least a first amplifier for amplifying the RF signal, and
  a feedback loop coupled around the first amplifier and comprising:
    a first tapping circuit configured to tap an amplified RF signal comprising a baseband signal component and a noise component downstream of the first amplifier;
    a downconverting circuit configured to downconvert the tapped RF signal to baseband frequency;
    a removing circuit configured to remove the baseband signal component from the downconverted signal; and
    an upconverting circuit configured to upconvert the resulting signal still comprising the noise component to RF,
  wherein the feedback loop is configured to feed the upconverted signal back to the RF signal processing stage upstream of the first amplifier, thereby suppressing the noise component.

15. The transmitter device of claim 14, wherein the feedback loop further comprises a second tapping circuit configured to tap the baseband signal component that is to be removed from the downconverted signal.

16. The transmitter device of claim 15, wherein the feedback loop further comprises a dedicated amplifier configured to amplify the tapped baseband signal.

17. The transmitter device of claim 14, wherein the feedback loop further comprises a filter configured to filter the downconverted signal to remove signal artefacts created by the downconversion.

18. A transmitter device comprising
  a baseband signal processing stage operating at baseband frequency and comprising at least one modulator for converting a baseband signal into an RF signal, and
  a radio frequency (RF) signal processing stage operating at RF and comprising at least a first amplifier for amplifying the RF signal, and
  a feedback loop coupled around the first amplifier and comprising:
    a first tapping circuit configured to tap an amplified RF signal comprising a baseband signal component and a noise component downstream of the first amplifier;
    a downconverting circuit configured to downconvert the tapped RF signal to baseband frequency; and
    a removing circuit configured to remove the baseband signal component from the downconverted signal in order to obtain a signal essentially containing the noise component;
  wherein the feedback loop is configured to feed the signal essentially containing the noise component back to the baseband signal processing stage upstream of the at least one modulator, thereby suppressing the noise component.

19. A transceiver device comprising:
  a transmitter device comprising:
    a baseband signal processing stage operating at baseband frequency and comprising at least one modulator for converting a baseband signal into an RF signal, and
    a radio frequency (RF) signal processing stage operating at RF and comprising at least a first amplifier for amplifying the RF signal, and
    a feedback loop coupled around the first amplifier and comprising:
      a first tapping circuit configured to tap an amplified RF signal comprising a baseband signal component and a noise component downstream of the first amplifier;
      a downconverting circuit configured to downconvert the tapped RF signal to baseband frequency;
      a removing circuit configured to remove the baseband signal component from the downconverted signal; and
      an upconverting circuit configured to upconvert the resulting signal still comprising the noise component to RF,
    wherein the feedback loop is configured to feed the upconverted signal back to the RF signal processing stage upstream of the first amplifier, thereby suppressing the noise component;
  a receiver device; and
  a duplexer having an antenna port, wherein the duplexer is configured to frequency selectively couple RF signals from the transmitter device to the antenna port and RF signals received via the antenna port to the receiver device.

20. A transceiver device comprising:

a transmitter device comprising:
- a baseband signal processing stage operating at baseband frequency and comprising at least one modulator for converting a baseband signal into an RF signal, and
- a radio frequency (RF) signal processing stage operating at RF and comprising at least a first amplifier for amplifying the RF signal, and
- a feedback loop coupled around the first amplifier and comprising:
  - a first tapping circuit configured to tap an amplified RF signal comprising a baseband signal component and a noise component downstream of the first amplifier;
  - a downconverting circuit configured to downconvert the tapped RF signal to baseband frequency; and
  - a removing circuit configured to remove the baseband signal component from the downconverted signal in order to obtain a signal essentially containing the noise component;
  - wherein the feedback loop is configured to feed the signal essentially containing the noise component back to the baseband signal processing stage upstream of the at least one modulator, thereby suppressing the noise component;

a receiver device; and a duplexer having an antenna port, wherein the duplexer is configured to frequency selectively couple RF signals from the transmitter device to the antenna port and RF signals received via the antenna port to the receiver device.

* * * * *